United States Patent
Cockcroft

(10) Patent No.: US 9,703,942 B2
(45) Date of Patent: Jul. 11, 2017

(54) MULTI-FACTOR AUTHENTICATION SYSTEM AND METHOD

(71) Applicant: eBay Inc., San Jose, CA (US)

(72) Inventor: Oliver Nicholas Cockcroft, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/097,100

(22) Filed: Dec. 4, 2013

(65) Prior Publication Data
US 2015/0154387 A1 Jun. 4, 2015

(51) Int. Cl.
| | |
|---|---|
| *G06F 21/31* | (2013.01) |
| *G06F 21/44* | (2013.01) |
| *G06F 21/36* | (2013.01) |
| *H04W 12/06* | (2009.01) |
| *G06Q 20/20* | (2012.01) |
| *H04L 29/06* | (2006.01) |
| *H04W 4/00* | (2009.01) |

(52) U.S. Cl.
CPC ............ *G06F 21/36* (2013.01); *G06Q 20/20* (2013.01); *H04W 12/06* (2013.01); *H04L 63/0861* (2013.01); *H04L 2463/082* (2013.01); *H04W 4/008* (2013.01)

(58) Field of Classification Search
CPC ..... H04L 63/08; H04L 63/0861; G06F 21/32; G06F 21/36; G06F 21/31
See application file for complete search history.

(56) References Cited

U.S. PATENT DOCUMENTS

| | | | |
|---|---|---|---|
| 8,508,338 B1 | 8/2013 | Fiddy | |
| 8,578,454 B2 | 11/2013 | Grim | |
| 2008/0307515 A1 | 12/2008 | Drokov et al. | |
| 2009/0240943 A1* | 9/2009 | Brown | H04L 9/3271 |
| | | | 713/171 |
| 2012/0110341 A1 | 5/2012 | Beigi | |

(Continued)

FOREIGN PATENT DOCUMENTS

| | | |
|---|---|---|
| EP | 2220840 A1 | 8/2010 |
| WO | WO-2015084816 A1 | 6/2015 |

OTHER PUBLICATIONS

"International Application Serial No. PCT/US2014/068109, International Search Report mailed Mar. 16, 2015", 2 pgs.

(Continued)

*Primary Examiner* — Izunna Okeke
(74) *Attorney, Agent, or Firm* — Schwegman, Lundberg & Woessner, P.A.

(57) ABSTRACT

A system and method of multi-factor authentication are described. In some embodiments, a first device provides an initial authentication data to a second device. The second device is different from the first device. The first device obtains a first response data from the second device. The first device generates a first subsequent authentication data using the first response data. The first subsequent authentication data is different from the initial authentication data. The first device provides the first subsequent authentication data to the second device. In some embodiments, obtaining the first response data comprises capturing the first response data from the second device using a camera on the mobile device, where the first response data is displayed on the second device.

17 Claims, 6 Drawing Sheets

(56) References Cited

U.S. PATENT DOCUMENTS

| | | | |
|---|---|---|---|
| 2013/0031623 A1* | 1/2013 | Sanders | 726/19 |
| 2013/0124855 A1 | 5/2013 | Varadarajan et al. | |
| 2013/0173915 A1* | 7/2013 | Haulund | 713/159 |
| 2013/0232073 A1 | 9/2013 | Sheets et al. | |
| 2013/0282589 A1 | 10/2013 | Shoup et al. | |

OTHER PUBLICATIONS

"International Application Serial No. PCT/US2014/068109, Written Opinion mailed Mar. 16, 2015", 10 pgs.

"International Application Serial No. PCT/US2014/068109, International Preliminary Report on Patentability mailed Jun. 16, 2016", 12 pgs.

"Australian Application Serial No. 2014357362. First Examiners Report mailed Mar. 6, 2017", 3 pgs.

"Canadian Application Serial No. 2,932,107, Office Action mailed Mar. 13, 2017", 4 pgs.

"European Application Serial No. 14868471.5, Extended European Search Report mailed Mar. 16, 2017", 7 pgs.

"Korean Application Serial No. 2016-7017755, Office Action mailed May 8, 2017", with English translation of claims, 11 pgs.

* cited by examiner

MULTI-FACTOR AUTHENTICATION SYSTEM AND METHOD

TECHNICAL FIELD

The present application relates generally to the technical field of data processing, and, in various embodiments, to systems and methods of multi-factor authentication.

BACKGROUND

Current techniques for authenticating users of devices are vulnerable to deception. As a result, the true owners of those devices and the accounts associated with them are susceptible to having transactions executed using their identity without their authorization.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1A:
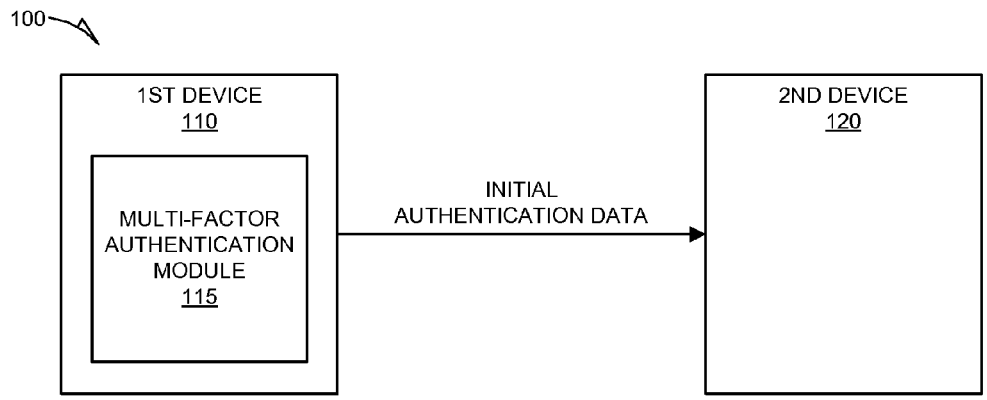
FIGS. 1A-1C illustrate a multi-factor authentication system, in accordance with some embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure describes systems and methods of multi-factor authentication. In some embodiments, the multi-factor authentication features disclosed herein are used in mobile payment processes to enable secure authenticated authorization of a payment for a transaction. During a mobile payment process, a mobile device can be used as a digital wallet. A mobile application on the mobile device can be used to employ the digital wallet functionality. The digital wallet can manage payment account information, including, but not limited to, credit card numbers, debit card numbers, other financial institution payment account information, expiration dates, security codes, shipping addresses, and billing addresses. When purchasing an item from a merchant, a user can use the digital wallet on his or her device to provide authentication data to a device of the merchant, such as an interface component of a POS terminal. This authentication data can then be used by the device of the merchant to initiate and verify payment using a secure payment server. Alternatively, the device of the merchant can provide the authentication data to the device of the user, which may then use the authentication data to initiate and verify payment using a secure payment server. It is contemplated that the features of the present disclosure can be applied to other forms of mobile payment as well.

The features of the present disclosure add one or more subsequent layers of authentication to the mobile payment process by having a single device provide initial authentication data, and then subsequent authentication data different from the initial authentication data.

In some embodiments, a first device provides an initial authentication data to a second device. The second device is different from the first device. The first device obtains a first response data from the second device. The first device then generates a first subsequent authentication data using the first response data. The first subsequent authentication data is different from the initial authentication data. The first device provides the first subsequent authentication data to the second device.

In some embodiments, the first subsequent authentication data is provided during an authorization process for a transaction. In some embodiments, the first device is a mobile device. In some embodiments, obtaining the first response data comprises capturing the first response data from the second device using a camera on the mobile device, the first response data being displayed on the second device. In some embodiments, the second device is an interface component of a POS terminal.

In some embodiments, the first subsequent authentication data comprises image-based data. In some embodiments, the image-based data comprises a bar code. In some embodiments, the first subsequent authentication data comprises audio-based data.

In some embodiments, the first subsequent authentication data is generated using at least one of facial recognition data, fingerprint recognition data, and voice recognition data.

In some embodiments, the first device obtains a second response data from the second device, and generates a second subsequent authentication data using the second response data. The second subsequent authentication data is different from the initial authentication data and the first subsequent authentication data. The first device then provides the second subsequent authentication data to the second device.

In some embodiments, the first subsequent authentication data is generated by the first device using an algorithm stored on the first device. In some embodiments, generating the first subsequent authentication data comprises transmitting an authentication data request to a third device, the third device being different from the first device and the second device, and then receiving the first subsequent authentication data from the third device.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

Figure 1B:
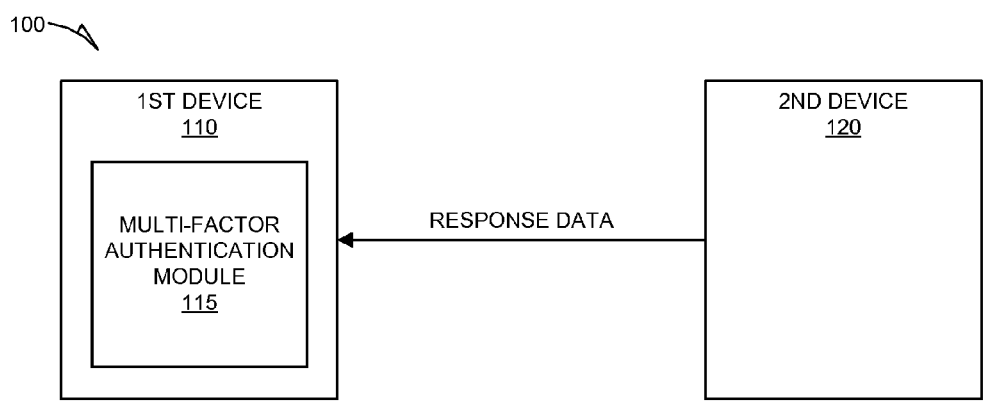
Figure 1C:
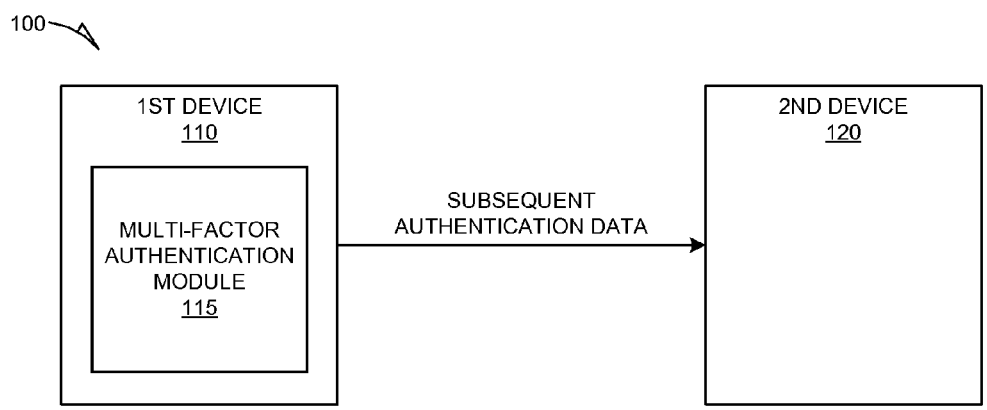

FIGS. 1A-1C illustrate a multi-factor authentication system 100, in accordance with some embodiments. In some embodiments, multi-factor authentication system 100 comprises a first device 110. First device 110 may be any computing device capable of receiving and providing data. First device 110 can comprise a memory and at least one processor (not shown). In some embodiments, first device 110 comprises a mobile device. Examples of a mobile device include, but are not limited to, smartphones and tablet computers. Other types of mobile devices are also within the scope of the present disclosure.

First device 110 can be used by a user to interact with a second device 120 in order to complete a purchase of a product or a service. Second device 120 can comprise a memory and at least one processor (not shown), and may be any computing device capable of receiving and providing data. In some embodiments, second device 120 may comprise an interface component of a POS terminal. For example, the user may be attempting to purchase a cup of coffee at a POS terminal in a coffee shop. In order to complete the purchase of the cup of coffee, the first device 110 and the second device 120 can exchange data to authenticate the transaction during an authorization process for the transaction.

In some embodiments, first device 110 comprises a multi-factor authentication module 115. In some embodiments, multi-factor authentication module 115 is part of a mobile application installed on the first device 110 and is executable by a processor. As seen in FIG. 1A, multi-factor authentication module 115 can be configured to provide an initial authentication data to second device 120. Responsive or otherwise subsequent to obtaining the initial authentication data from first device 110, second device 120 can provide response data to first device 110, as seen in FIG. 1B. Responsive or otherwise subsequent to obtaining the first response data from second device 120, multi-factor authentication module 115 can generate a subsequent authentication data using the first response data, and then provide the subsequent authentication data to second device 120, as seen in FIG. 1C. The first subsequent authentication data is different from the initial authentication data.

The back and forth exchange of authentication data and response data between first device 110 and second device 120 can be repeated multiple times so that as many layers of authentication that are desired can be added. In this fashion, different subsequent authentication data can be generated and provided multiple times before the purchase is actually authorized and completed.

The initial authentication data, the response data, and the subsequent authentication data can be provided in a variety of different forms. In some embodiments, the initial authentication data, the response data, and the subsequent authentication data comprises image-based data. One example of image-based data that can be used is a barcode. For example, multi-factor authentication module 115 can be configured to generate and provide Quick Response (QR) codes as authentication data. It is contemplated that other types of image-based data are also within the scope of the present disclosure.

Figure 2A:
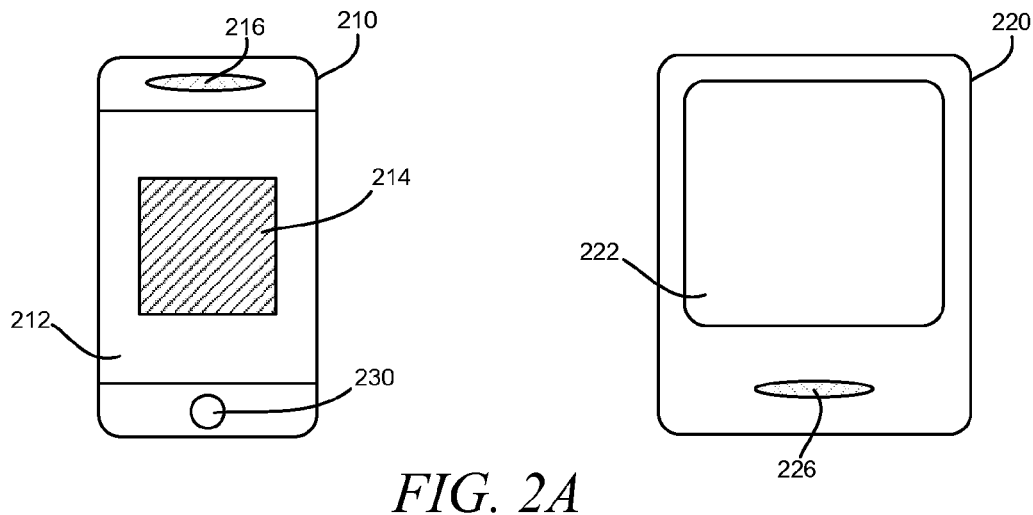
FIGS. 2A-2C illustrate the exchange of data between a mobile device and an interface component of a point of sale (POS) terminal, in accordance with some embodiments.
Figure 2B:
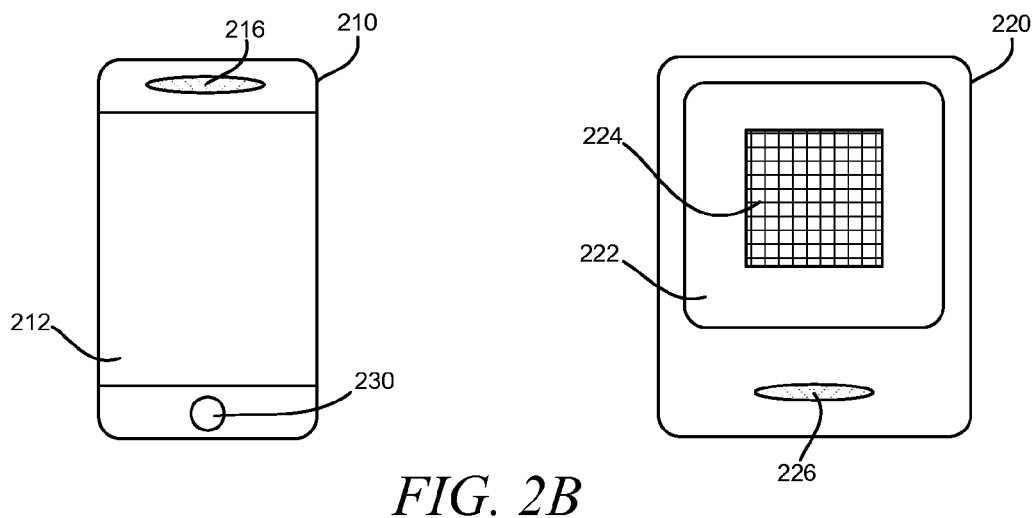
Figure 2C:
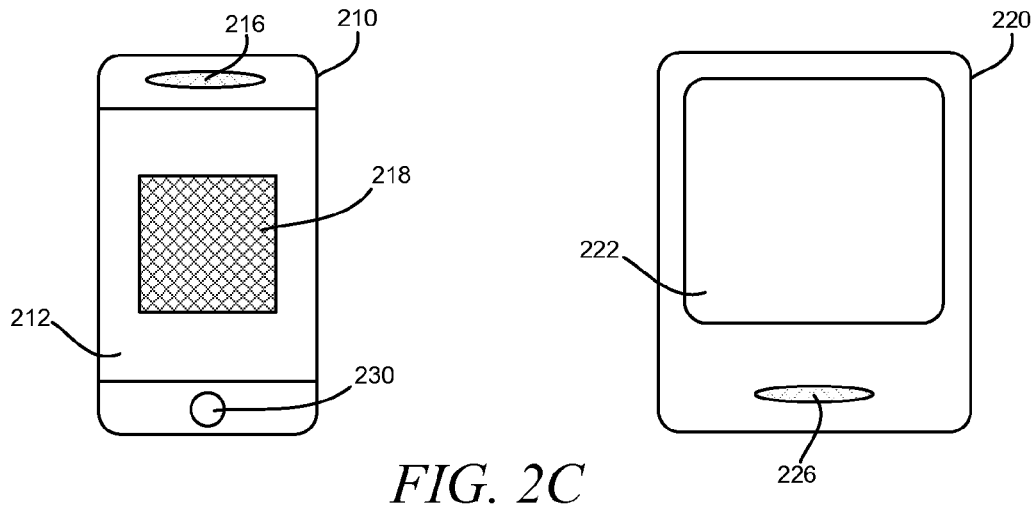

FIGS. 2A-2C illustrate the exchange of data between a mobile device 210 and an interface device 220 of a POS terminal, in accordance with some embodiments. In some embodiments, mobile device 210 can be first device 110 of FIG. 1 and comprise multi-factor authentication module 115, and interface device 220 can be second device 120 of FIG. 1. However, it is contemplated that other configurations are also within the scope of the present disclosure.

As seen in FIG. 2A, mobile device 210 can display image-based initial authentication data 214 on a display screen 212. As previously mentioned, image-based initial authentication data 214 can comprise a barcode. However, it is contemplated that other forms of image-based initial authentication data 214 are also within the scope of the present disclosure. In some embodiments, interface device 220 can obtain image-based initial authentication data 214 by capturing it via a scanner (not shown).

As seen in FIG. 2B, in response or otherwise subsequent to interface device 220 obtaining image-based initial authentication data 214, interface device 220 can display image-based response data 224 on a display screen 222. As previously mentioned, image-based response data 224 can comprise a barcode. However, it is contemplated that other forms of image-based response data 224 are also within the scope of the present disclosure. In some embodiments, mobile device 210 can obtain image-based response data 224 by capturing it via a built-in camera component 230.

As seen in FIG. 2C, in response or otherwise subsequent to mobile device 210 obtaining image-based response data 224, mobile device 210 can display image-based subsequent authentication data 218 on display screen 212. As previously mentioned, image-based subsequent authentication data 218 can comprise a barcode. However, it is contemplated that other forms of image-based subsequent authentication data 218 are also within the scope of the present disclosure.

In addition or as an alternative to the image-based data discussed above, other forms of data can be used as well. In some embodiments, audio-based initial authentication data, audio-based response data, and audio-based subsequent authentication data can be used during the authentication process. For example, mobile device 210 can provide audio-based initial authentication data and audio-based subsequent authentication data via a built-in speaker 216, and interface device 220 can provide audio-based response data via a built-in speaker 226. This audio-based data can comprise a uniquely identifiable sound that can be used by an algorithm employed by the counterpart device to provide another uniquely identifiable sound or to authenticate the transaction at issue.

In some embodiments, initial authentication data, response data, and subsequent authentication data can be transmitted by one device to another device via wireless communication, such as near field communication. It is contemplated that other forms of data and transmitting data are also within the scope of the present disclosure.

Additionally, different forms or modes of data can be employed within the same authentication process. For example, in one embodiment, mobile device 210 can provide the initial authentication data as a barcode displayed on display screen 212, interface device 220 can provide the response data in the form of uniquely identifiable audio via speaker 226, and then mobile device 210 can provide the subsequent authentication data as code via a near field communication transmission. Other configurations are also within the scope of the present disclosure.

In some embodiments, authentication data can be determined by an algorithm residing on the device directly involved in the transaction, such as first device 110 or second device 120 in FIG. 1 or mobile device 210 or interface device 220 in FIG. 2. However, in some embodiments, these devices can obtain the authentication data from an external independent device on which an algorithm that determines the authentication data resides, and then provide the authentication data to its counterpart device that is directly involved in the transaction. In some embodiments, the algorithm used to generate the authentication data can be unique and correspond to a key on the device (e.g., first device 110) that will be providing the authentication data to the other device (e.g., second device 120), or to a key registered or otherwise corresponding to an application on that device that will be providing the authentication data. In this respect, each device can have its own unique algorithm to generate and provide its own unique authentication data.

Figure 3A:
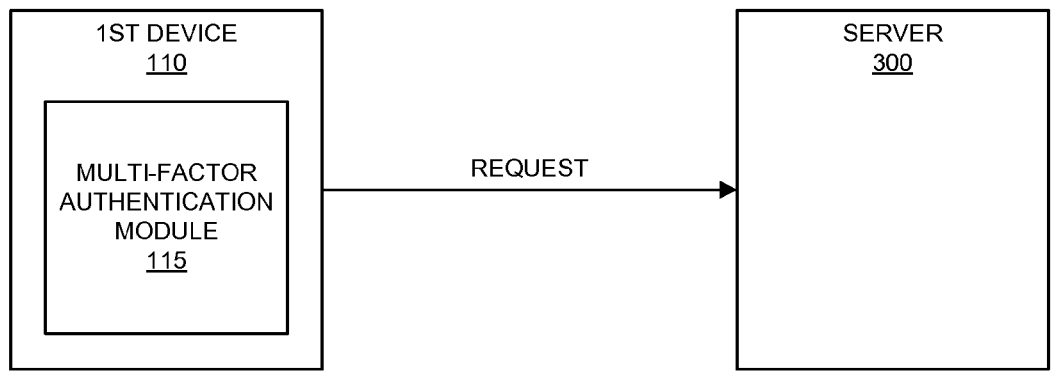
FIGS. 3A-3B illustrate generation of subsequent authentication data in a multi-factor authentication system, in accordance with some embodiments.
Figure 3B:
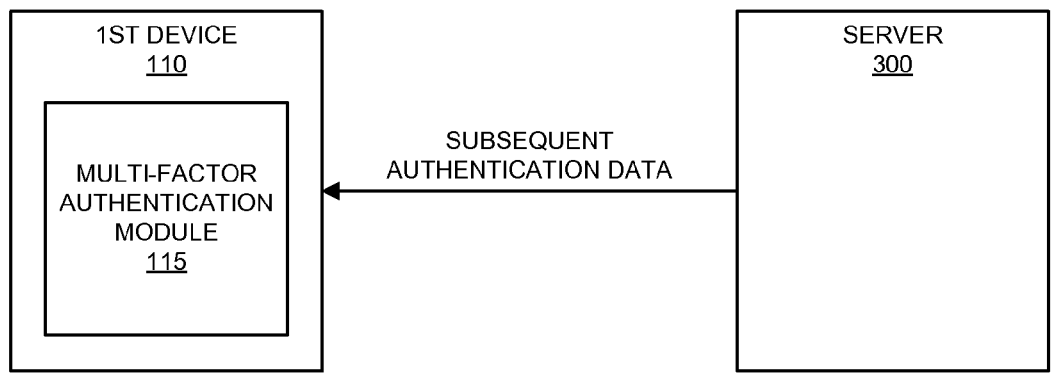

FIGS. 3A-3B illustrate the generation of subsequent authentication data in a multi-factor authentication system, in accordance with some embodiments. As seen in FIG. 3A, first device 110 can request authentication data from an external independent device, such as server 300. Server 300 may comprise an algorithm configured to generate the subsequent authentication data discussed above. In some embodiments, the request sent from first device 110 to server 300 comprises the response data provided by second device 120 to first device 110. Server 300 can then use the response data to generate the subsequent authentication data, which it can then provide to first device 110, as seen in FIG. 3B. First device 110 can then provide the subsequent authentication data to second device 120, as previously discussed. In some embodiments, first device 110 and server 300 communicate with each other via the Internet. However, other modes and channels of communication are also within the scope of the present disclosure.

Figure 4:
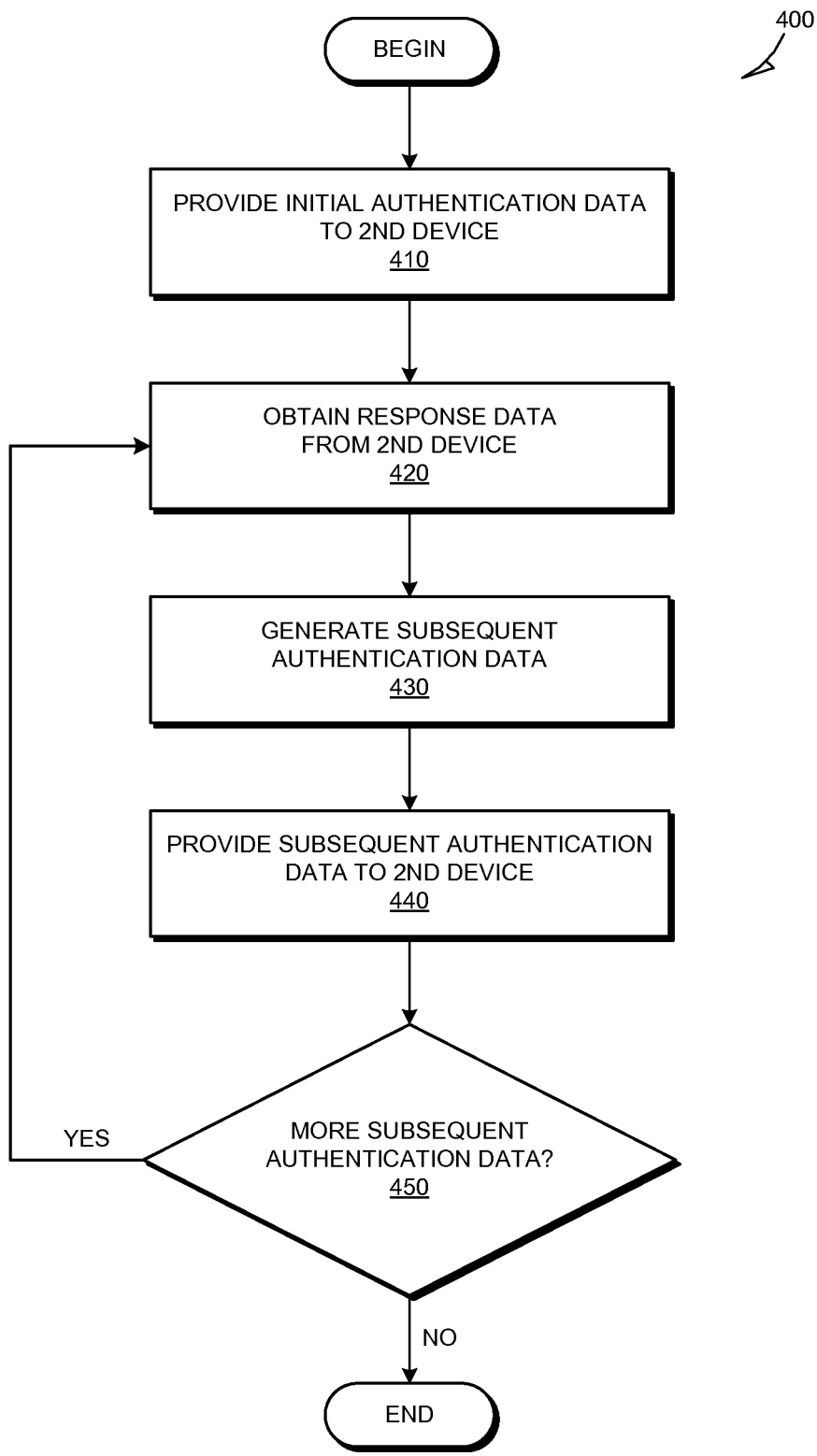
FIG. 4 is a flowchart illustrating a method of multi-factor authentication, in accordance with some embodiments.

FIG. 4 is a flowchart illustrating a method 400 of multi-factor authentication, in accordance with some embodiments. The operations of method 400 may be performed by a system or modules of a system (e.g., system 100, first device 110, or multi-factor authentication module 115).

At operation 410, first device 110 provides initial authentication data to second device 120. As previously discussed, the initial authentication data can be provided in a variety of forms, including, but not limited to, visual data, audio data, and near field communication data.

At operation 420, first device 110 obtains response data from second device 120. As previously discussed, the response data can be obtained in a variety of ways, including, but not limited to capturing the response data via a built-in camera on the first device 110.

At operation 430, first device 110 generates subsequent authentication data. As previously discussed, in some embodiments, first device uses the response data to generate subsequent authentication data that is different from the initial authentication data.

At operation 440, first device 110 provides the subsequent authentication data to second device 120. As previously discussed, the subsequent authentication data can be provided in a variety of forms, including, but not limited to, visual data, audio data, and near field communication data.

At operation 450, if additional layers of authentication are desired, then the method 400 can repeat at operation 420, where first device 100 can obtain response data again from second device 420, and then generate and provide subsequent authentication data at operations 430 and 440, respectively. For each layer and cycle of authentication, unique subsequent authentication data can be generated and provided. If additional layers of authentication are not desired at operation 450, then method 400 may come to an end.

It is contemplated that the operations of method 400 may incorporate any of the other features disclosed herein.

As previously discussed, although the authentication data discussed above can be generated by an algorithm residing on one of the devices (e.g., first device 110 or second device 120) directly involved in the transaction at issue, it is contemplated that, in some embodiments, another device that is external and independent of first device 110 and second device 120 can use an algorithm to determine the subsequent authentication data and provide it to one of the devices directly involved in the transaction at issue.

Figure 5:
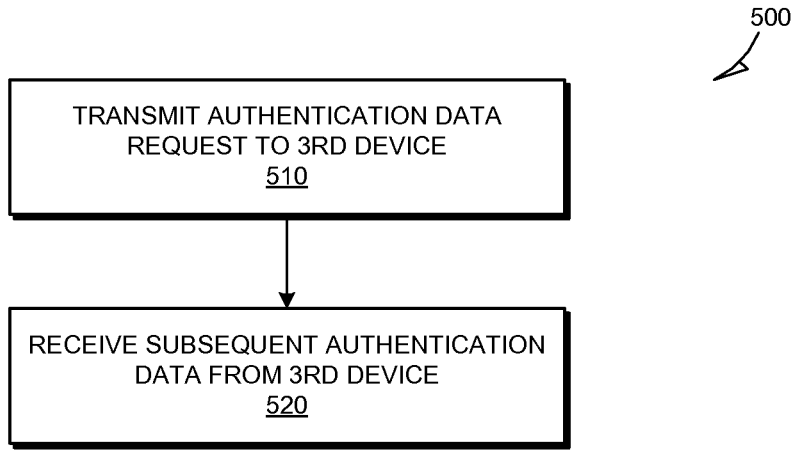
FIG. 5 is a flowchart illustrating a method of generating subsequent authentication data, in accordance with some embodiments.

FIG. 5 is a flowchart illustrating a method 500 of generating subsequent authentication data, in accordance with some embodiments. The operations of method 500 may be performed by a system or modules of a system (e.g., system 100, first device 110, or multi-factor authentication module 115). At operation 510, first device 110 can transmit a request for authentication data to a third device, such as server 300 in FIGS. 3A-3B. At operation 520, first device 110 can receive the subsequent authentication data generated the third device. It is contemplated that the operations of method 500 may incorporate any of the other features disclosed herein.

Figure 6:
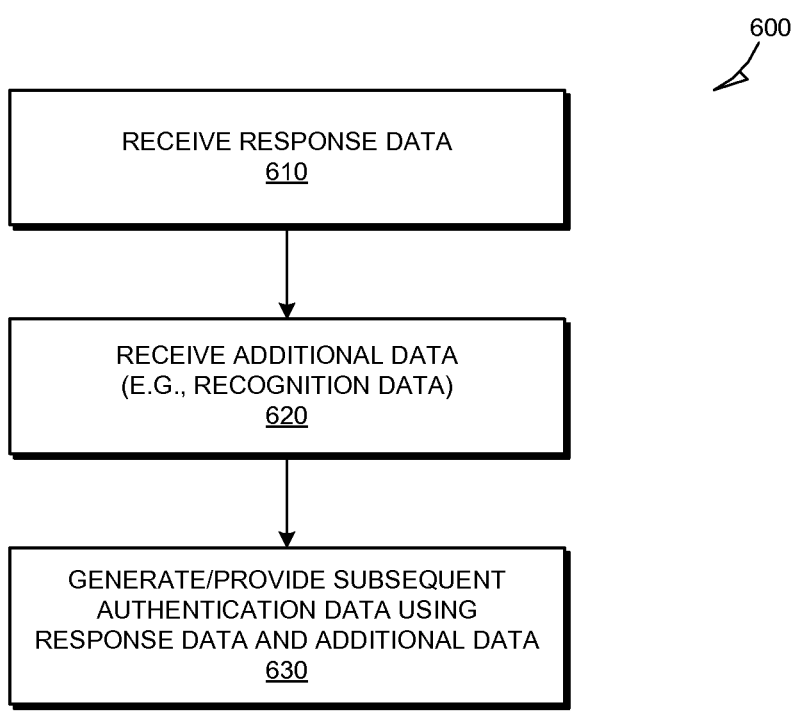
FIG. 6 is a flowchart illustrating another method of generating subsequent authentication data, in accordance with some embodiments.

In some embodiments, the algorithm used to generate the subsequent authentication data can receive and use a variety of different data to generate the subsequent authentication data. FIG. 6 is a flowchart illustrating another method 600 of generating subsequent authentication data, in accordance with some embodiments. The operations of method 600 may be performed by a system or modules of a system (e.g., system 100, first device 110, or multi-factor authentication module 115). At operation 610, response data is received.

At operation 620, additional data other than the response data is received. In some embodiments, this additional data comprises recognition-based data. Examples of recognition-based data include, but are not limited to, facial recognition data, fingerprint recognition data, and voice recognition data. The recognition data can be obtained using data capturing devices, including, but not limited to, cameras, touchscreens, and microphones. In one example, a user attempting to purchase a product can apply his or her finger to the touchscreen of a smartphone, thereby enabling the smartphone to capture the user's fingerprint. In some embodiments, the additional data can include a key, token, or other identifier that is unique to and corresponds to the device (e.g., the user's smartphone) that is being used to pay for the product or service at issue.

At operation 630, the subsequent authentication data is generated and provided using the response data and the additional data. In some embodiments, the additional data is used by the algorithm that generates the subsequent authentication data in its generation of the subsequent authentication data. In some embodiments, the additional data is used to identify which algorithm to use to generate the subsequent authentication data, such as by determining that the additional data corresponds to a particular user or device, and then determining the algorithm that corresponds to that particular user or device.

It is contemplated that the operations of method 600 may incorporate any of the other features disclosed herein.

As previously discussed, although examples disclosed herein show the multi-factor authentication module 115 and/or the algorithm used to generate the subsequent authentication data residing on first device 110, it is contemplated that the multi-factor authentication module 115 and/or the algorithm for generating the subsequent authentication data can reside on other devices as well, such as second device 120 and server 300.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
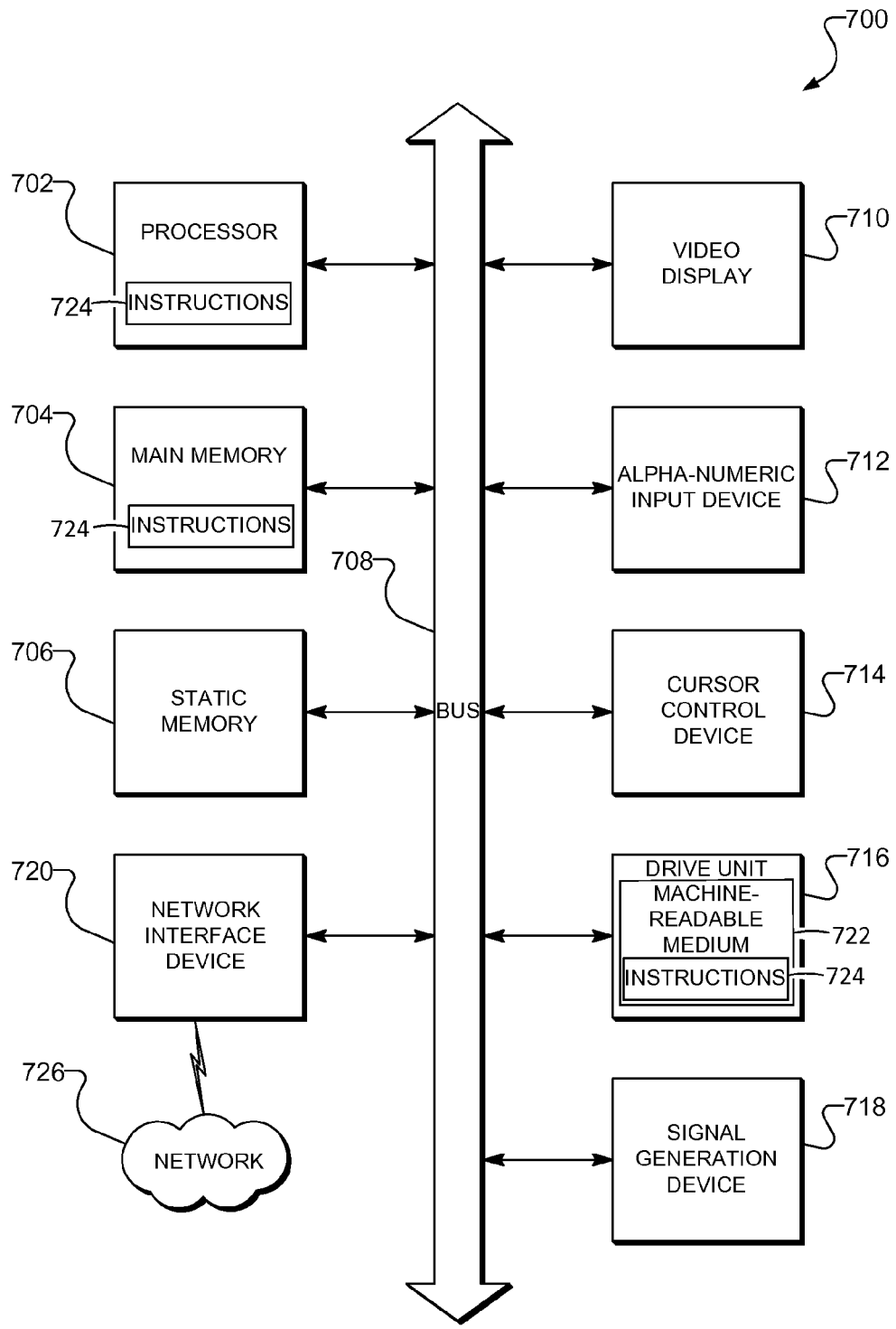
FIG. 7 shows a diagrammatic representation of a machine in the example form of a computer system within which a set of instructions may be executed to cause the machine to perform any one or more of the methodologies discussed herein, in accordance with some embodiments.

FIG. 7 is a block diagram of a machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   providing, by a first device having a memory and at least one processor, an initial authentication data to a second device, the second device being different from the first device;
   obtaining, by the first device, a first response data from the second device subsequent to providing the initial authentication data to the second device;
   generating, by the first device, a first subsequent authentication data using the first response data, the first subsequent authentication data being different from the initial authentication data, the generating the first subsequent authentication data comprising:
      transmitting an authentication data request to a third device, the third device being different from the first device and the second device; and
      receiving the first subsequent authentication data from the third device;
   providing, by the first device, the first subsequent authentication data to the second device;
   obtaining, by the first device, a second response data from the second device;
   generating, by the first device, a second subsequent authentication data using the second response data, the second subsequent authentication data being different from the initial authentication data and the first subsequent authentication data; and
   providing, by the first device, the second subsequent authentication data to the second device.

2. The method of claim 1, wherein the first subsequent authentication data is provided during an authorization process for a transaction.

3. The method of claim 1, wherein the first device is a mobile device.

4. The method of claim 3, wherein obtaining the first response data comprises capturing the first response data from the second device using a camera on the mobile device, the first response data being displayed on the second device.

5. The method of claim 3, wherein the second device is an interface component of a point of sale terminal.

6. The method of claim 1, wherein the first subsequent authentication data comprises image-based data.

7. The method of claim 6, wherein the image-based data comprises a bar code.

8. The method of claim 1, wherein the first subsequent authentication data comprises audio-based data.

9. The method of claim 1, wherein the first subsequent authentication data is generated using at least one of facial recognition data, fingerprint recognition data, and voice recognition data.

10. The method of claim 1, wherein the first subsequent authentication data is generated by the first device using an algorithm stored on the first device.

11. A system comprising:
    a first machine having a memory and at least one processor; and
    a multi-factor authentication module, executable by the at least one processor, configured to:
       provide an initial authentication data to a second machine, the second machine being different from the first machine;
       obtain a first response data from the second machine subsequent to providing the initial authentication data to the second device;
       generate a first subsequent authentication data using the first response data, the first subsequent authentication data being different from the initial authentication data, the generating the first subsequent authentication data comprising:
          transmitting an authentication data request to a third device, the third device being different from the first device and the second device; and
          receiving the first subsequent authentication data from the third device;
       provide the first subsequent authentication data to the second machine;
       obtain a second response data from the second device;
       generate a second subsequent authentication data using the second response data, the second subsequent authentication data being different from the initial authentication data and the first subsequent authentication data; and
       provide the second subsequent authentication data to the second device.

12. The system of claim 11, wherein the first machine comprises a mobile device.

13. The system of claim 12, wherein the multi-factor authentication module is further configured to obtain the first response data by capturing the first response data from the second machine using a camera on the mobile device, the first response data being displayed on the second machine.

14. The system of claim 11, wherein the first subsequent authentication data comprises image-based data.

15. The system of claim 11, wherein the multi-factor authentication module is further configured to generate the first subsequent authentication using at least one of facial recognition data, fingerprint recognition data, and voice recognition data.

16. A non-transitory machine-readable storage device storing a set of instructions that, when executed by at least one processor, causes the at least one processor to perform a set of operations comprising:
    providing, by a first device having a memory and at least one processor, an initial authentication data to a second device, the second device being different from the first device;
    obtaining, by the first device, a first response data from the second device subsequent to providing the initial authentication data to the second device;
    generating, by the first device, a first subsequent authentication data using the first response data, the first subsequent authentication data being different from the initial authentication data, the generating the first subsequent authentication data comprising:
       transmitting an authentication data request to a third device, the third device being different from the first device and the second device; and
       receiving the first subsequent authentication data from the third device;
    providing, by the first device, the first subsequent authentication data to the second device;
    obtaining, by the first device, a second response data from the second device;
    generating, by the first device, a second subsequent authentication data using the second response data, the second subsequent authentication data being different from the initial authentication data and the first subsequent authentication data; and providing, by the first device, the second subsequent authentication data to the second device.

17. The storage device of claim 16, wherein obtaining the first response data comprises capturing the first response data from the second device using a camera on the mobile device, the first response data being displayed on the second device.

* * * * *